United States Patent [19]

Koch

[11] 4,206,933

[45] Jun. 10, 1980

[54] SLEIGH HAVING AN IMPROVED INFLATABLE BODY

[76] Inventor: Herbert Koch, Pinswang 4, D-8211 Rimsting, Fed. Rep. of Germany

[21] Appl. No.: 927,426

[22] Filed: Jul. 24, 1978

[30] Foreign Application Priority Data

Jan. 14, 1978 [DE] Fed. Rep. of Germany ....... 7801034

[51] Int. Cl.² .................... B62B 15/00; B62B 13/16
[52] U.S. Cl. ..................................... 280/18; 9/310 F
[58] Field of Search .............. 280/18, 19, 12 B, 12 R; 9/310 F

[56] References Cited

U.S. PATENT DOCUMENTS

| 2,986,751 | 6/1961 | Baren | 9/310 F |
| 3,156,483 | 11/1964 | See | 280/18 X |

FOREIGN PATENT DOCUMENTS

| 101633 | 7/1937 | Australia | 9/310 F |
| 280580 | 10/1964 | Australia | 9/310 F |
| 166319 | 7/1950 | Austria | 9/310 F |

Primary Examiner—John A. Pekar
Assistant Examiner—Milton L. Smith
Attorney, Agent, or Firm—Pollock, VandeSande and Priddy

[57] ABSTRACT

A sleigh having an inflatable body which is wedge-shaped at its forward portion and parallel-sided at its rear portion, the body being subdivided into three inflatable compartments by two spaced longitudinally extending interior webs which slant outwardly relative to one another in their downward directions. The forward ends of the upper edges of the webs are slightly higher than their rear ends. The upper surfaces of the two outer compartments bulge upwardly to a greater extent than the upper surface of the center compartment. Guide foils having longitudinally extending grooves are disposed below the three compartments at the rear end of the body, the foils associated with the outer two compartments being displaced inwardly relative to their respective compartment axes in the unloaded condition of the sleigh.

4 Claims, 2 Drawing Figures

SLEIGH HAVING AN IMPROVED INFLATABLE BODY

The present invention relates to a sleigh for riding on snow, and is more particularly concerned with a sleigh having an inflatable body which is shaped substantially in the form of a wedge and which has its interior divided by longitudinal webs into compartments.

Sleighs having an inflatable body, the interior of which is subdivided into compartments, are known. The interior separating webs of these known sleighs ordinarily extend in parallel planar relationship to each other, i.e. the webs are oriented vertically from top to bottom, and the heights of said webs at their respective forward ends are ordinarily the same as at their rear ends. As a result, the vertical webs in known sleighs define a plurality of interior compartments of substantially identical profile. These configurations of the interior webs, and the resulting configuration of the sleigh body, detract from the functional aspects of the sleigh for various reasons which will become apparent hereinafter.

It is the object of the present invention to improve the seating and the running conditions of sleighs having an inflatable body. A further object of the invention is to prevent the forming of wrinkles in the upper and the lower body sections within the region of the front ends of the separating webs. To achieve these objects, the improved sleigh of the present invention comprises an inflatable body having only two separating webs, forming three elongated, generally parallel inflatable compartments within the body. The separating webs are spaced a lesser distance from each other at their upper edges than at their lower edges, with the result that said two interior separating webs do not extend in parallel planar relation to one another and, instead, slant downward-outwardly. As a result, the upper surface of the center compartment of the inflatable body has a smaller width than its lower surface, the exterior lower surfaces of all three compartments have substantially identical bearing areas, and the upper surfaces of the two outer compartments bulge upwardly to a greater extent than the upper surface of the center compartment. This novel configuration of the body provides a highly satisfactory seating accomodation and keeps a person seated on the sleigh from sliding off sideways. Furthermore, this novel configuration assures that the lower portions of the three compartments will be under equal loads during the ride, which facilitates control of the sleigh.

The separating webs employed in the present invention are slightly higher at the front of the sleigh than in back, the difference in height amounting to approximately 1 cm, for example. This feature of the invention improves the rider's leg support and, in addition, prevents the formation of wrinkles in the body sections within the region of the front ends of the separating webs. The separating webs terminate, as in the case of known sleighs having inflatable bodies, in front as well as in the back at a distance from the outer edges of the upper and the lower body sections to provide communication between the elongated interior compartments of the body adjacent their respective forward and rearward ends.

It is advantageous, for reasons of seating as well as control, to provide a pair of handrails or hand-holds, which are known per se, adjacent the opposite sides of the frontal, wedge-shaped portion of the inflatable body. A person seated on the sleigh holds onto these two handrails during the ride, and leans backwards, thereby moving the center of gravity to the rear portion of the sleigh and causing the surface load at the lower section of the body to increase toward the rear end of the sleigh.

Guide means are secured, e.g. by welding, to the underside of the outer section of the body adjacent the rear end of the inflatable body. These guide means preferably take the form of corrugated or grooved foils fabricated of metal, plastic, or the like, with the grooves or corrugations in said foils running parallel to each other in the longitudinal direction of the sleigh. The corrugated or grooved foils are located respectively below each of the inflatable compartments exclusively at the rearward end of the body, and the foils which are positioned below the two outer compartments are preferably offset inwardly relative to their respective compartment axes so that, due to deformation of the sleigh in its loaded condition, the foil sections will be the primary components in contact with the snow to assure proper control of the sleigh and to minimize wear of or damage to the body material itself.

A preferred example of the present invention is illustrated in the accompanying drawings, wherein.

Figure 1:
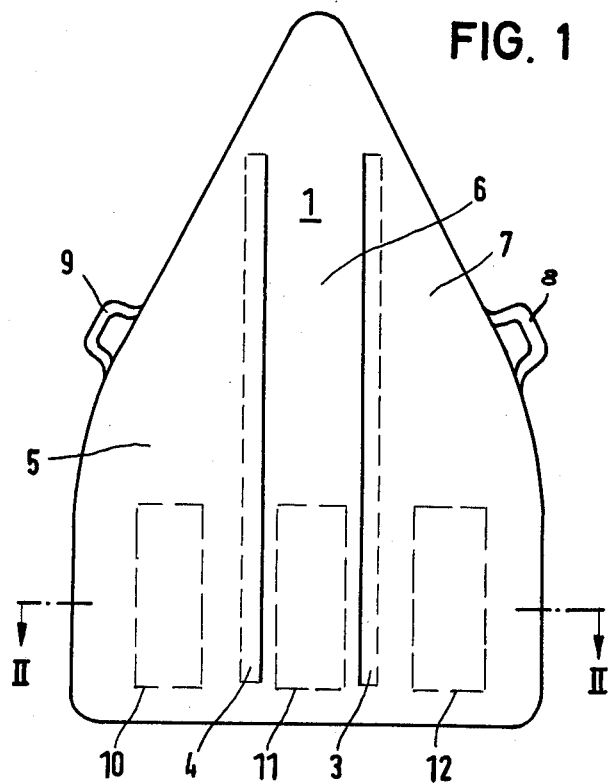
FIG. 1 is a plan view of the improved sleigh of the present invention.

The sleigh of the present invention comprises an upper body section 1 and a lower body section 2 fabricated of an appropriate air-tight flexible material, and having the outer edges of sections 1, 2 welded or otherwise fastened together to form an enclosed inflatable body. As shown in the plan view of FIG. 1, the front portion of the inflatable body is wedge-shaped while the rear portion of the body, serving as the seating support, has substantially parallel outer edges. The interior of the inflatable body is subdivided, by two longitudinally extending separating webs 3, 4, into three elongated generally parallel compartments 5, 6, 7. These interior compartments are in communication with each other at their front and rear ends since the front and the rear ends of the interior separating webs 3, 4 terminate respectively at a distance from the outer edges of the body sections 1, 2.

Figure 2:
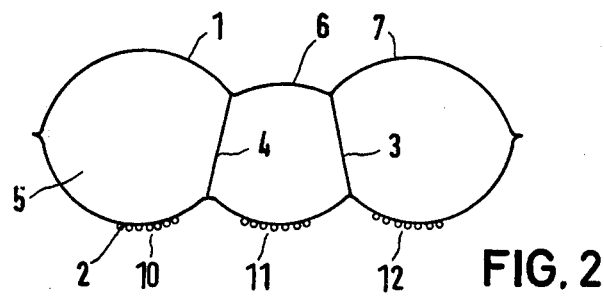
FIG. 2 is a sectional view of the inflatable body taken along line II—II of FIG. 1.

As best shown in FIG. 2, the upper edges of the two separating webs 3, 4 are spaced from one another by a lesser distance than their lower edges with the result that the planes of webs 3, 4 are not parallel to one another and, instead, slant outwardly relative to one another in their downward directions within the body. As a result of this configuration, the upper sections of the outer compartments 5, 7 will bulge upwardly to a significantly greater extent than the upper sections of the center compartment 6. The curvatures, and thus the bearing areas, at the lower sections of the compartments are, however, identical for all three compartments 5, 6 and 7. The separate connecting web, which is customarily provided at the center of the central compartment in known inflatable-body sleighs, can now be omitted.

Two handrails or hand-holds 8, 9 are provided on opposite sides of the wedge-shaped front part of the body. They are preferably formed integrally with one or both body sections 1, 2. In addition, the webs 3, 4 are so shaped that they are slightly higher at the forward end of the body than at the rear end of the body. These particular aspects of the present invention improve the riding qualities of the sleigh for reasons discussed previously.

Guide means 10, 11, 12 are provided at the underside of each compartment 5, 6 and 7. The guide means preferably take the form of corrugated or grooved foils wherein the corrugations or grooves run parallel to each other in the longitudinal direction of the sleigh. The guide means 10–12 are provided exclusively at the rear portion of the sleigh. Moreover, the foils 10, 12 associated with the two outer compartments 5, 7 respectively are slightly offset inwardly relative to their respective compartment axes in the unloaded condition of the body to assure that, when the sleigh is loaded, and the lower sections of the body are deformed, the resulting spreading apart of foils 10, 12 will cause the foil sections 10–12 to be the primary components in contact with the snow.

Having thus described my invention, I claim:

1. A sleigh having an inflatable body which is shaped substantially in the form of a wedge, the interior of said body being subdivided into three longitudinally extending adjacent compartments by two spaced webs which extend longitudinally of said body between the interior upper and lower surfaces of said body, the upper and lower edges of said webs extending substantially parallel to one another, the horizontal spacing between the upper edges of said two webs at said upper surface of said body being less than the horizontal spacing between the lower edges of said webs at said lower surface of said body whereby said webs slant outwardly relative to one another in their downward directions within said body, the upper surfaces of the outer ones of said compartments bulging upwardly to a greater extent than the upper surface of the center compartment when said body is inflated, the forward end of said body having a wedge-shape, the rear end of said body having substantially parallel outer edges, the spacing between the lower edges of said webs at the rear end of said body being substantially equal to the spacing between each of said webs and the adjacent outer edge of said body in the region of said body between said parallel outer edges, and guide means attached to the exterior of the lower surface of said body only in the region of said body between said parallel outer edges, said guide means comprising grooved members located below each of said three compartments respectively, the grooves in said members extending substantially parallel to one another in the longitudinal direction of said body.

2. The inflatable sleigh of claim 1 wherein the upper edges of said webs are slightly higher at the forward end of said body than at the rear end of said body.

3. The inflatable sleigh of claim 1 including handholds disposed on both sides of said body at the wedge-shaped forward end of said body.

4. The inflatable sleigh of claim 1 wherein the grooved members below the two outer compartments are offset inwardly relative to their respective compartment axes when said sleigh is in its unloaded condition.

* * * * *